United States Patent Office 3,397,123
Patented Aug. 13, 1968

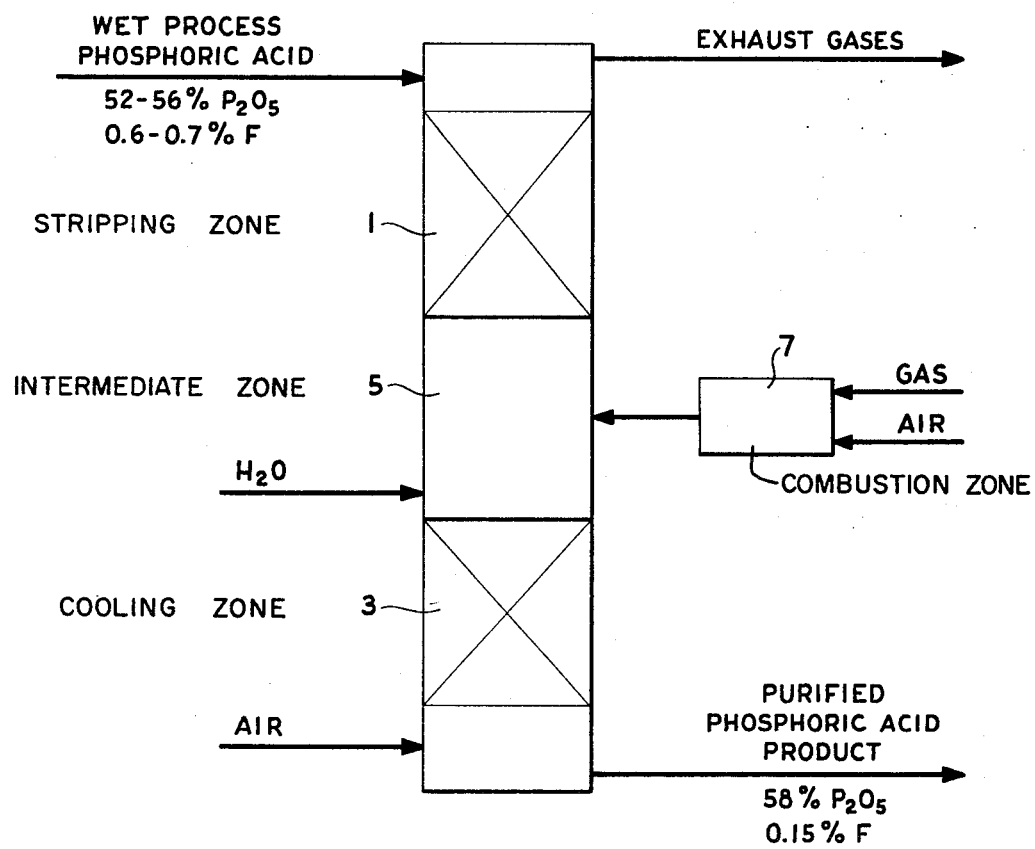

3,397,123
PURIFYING AQUEOUS ACID PHOSPHATE SOLUTIONS CONTAINING FLUORINE IMPURITIES
Jay A. Cull, Jeffersonville, Ind., assignor to Hooker Chemical Corporation, Niagara Falls, N.Y., a corporation of New York
Filed June 3, 1965, Ser. No. 461,023
10 Claims. (Cl. 203—49)

ABSTRACT OF THE DISCLOSURE

A process for purifying an aqueous acidic phosphate solution containing fluorine values as an impurity comprising forming the solution into a film, continuously passing the film in countercurrent contact with a stream of hot combustion gases in a weight ratio of acidic solution to combustion gas of from 0.5:1 to 2:1, repeatedly stripping and absorbing the fluorine values for a period sufficient to reduce the fluorine content of the solution to a final P/F ratio of a minimum of 100:1 under temperature and pressure conditions sufficient to remove substantially all of the free water with the fluorine values.

---

This invention relates to a method for purifying acidic phosphate solutions and more particularly it relates to an improved process for defluorinating impure phosphoric acid solutions which contain fluorine values as an undesirable impurity.

Many acidic phosphate solutions which are used in industrial processes contain appreciable amounts of fluorine values as impurities. For example, the so-called "wet process" phosphoric acid, which is made by treating phosphate rock with sulfuric acid, normally has a fluorine content of at least about 0.5 percent by weight and frequently even higher. Inasmuch as the fluorine content of the wet process phosphoric acid depends upon the amount of fluorine contained in the phosphate rock or apatite used as the initial reactant, it is not uncommon that wet process phosphoric acid contains fluorine in amounts of 2 to 3 percent or more.

Although for some industrial uses of wet process phosphoric acid, the fluorine values in the phosphoric acid are not objectionable or at least may be tolerated, in many uses, this is not true, as for example, where the wet process phosphoric acid is used in the manufacture of animal feed substances. In the preparation of animal feed supplement materials, such as dicalcium phosphate, limestone is reacted with the wet phosphoric acid in amounts which will provide the desired ratio of calcium to phosphorus in the product. The fluorine contained in the wet process phosphoric acid used in this reaction is, to a great extent, carried over into the dicalcium phosphate product, which product may then have a fluorine content of about one percent or more. Inasmuch as the phosphorus content of such calcium feed supplement is generally about 15–22 percent and the generally allowable minimum ratio of phosphorus to fluorine values in such feed supplements is about 100:1, it is apparent that such feed supplements which contain an excess of about 0.20 percent fluorine, are not suitable because of their high fluorine content.

While it is possible to treat such high fluorine content calcium phosphate feed supplement materials, so as to reduce the fluorine content to an acceptable level, such processes are generally not preferred as they may result in changing the calcium to phosphorus ratio of the feed supplement so that a further adjustment of this ratio may have to be made before this supplement can be used. Inasmuch as substantially all of the fluorine content of the calcium phosphate feed supplement material comes from the phosphoric acid which is used in its preparation, it has been found to be preferable if the phosphoric acid is defluorinated prior to the time it is used to prepare the calcium phosphate supplement.

Although many processes for such purification of phosphoric acid have been proposed in the past, these have frequently been time consuming, often taking several hours to obtain a product having a suitably low fluorine content. Additionally, such prior processes have, for the most part, been batch processes which have not been readily adaptable for continuous purification of the acid. Moreover, in some instances, even when using such purification processes, it has not been possible to reduce the fluorine content of the wet process phosphoric acid to a sufficiently low level. In these cases, a further purification of the calcium phosphate feed supplement product may then be desirable in order to further reduce the fluorine content to an acceptable level.

It is, therefore, an object of the present invention to provide an improved method for treating acidic phosphate solutions containing fluorine values as impurities, wherein there is produced an acidic phosphate product with a fluorine content which is sufficiently low as to be suitable for use in making calcium phosphate feed supplements.

Another object of the present invention is to provide an improved process for defluorinating wet process phosphoric acid, which process may be carried out as a continuous process to produce a low fluorine content phosphoric acid in a relatively short period of time.

These and other objects of the present invention will become apparent to those skilled in the art from a description of the invention which follows.

Pursuant to the above objects, the present invention includes a process for purifying an aqueous acidic phosphate solution containing fluorine values as an impurity, which process comprises forming the aqueous acidic phosphate solution to be purified into a film, continuously passing said film in countercurrent contact with a stream of hot combustion gases, maintaining the combustion gases in contact with the acid solution, while effecting multiple, repeated strippings and absorptions of the fluorine values in the acid solution, for a period of time sufficient to reduce the fluorine content of the acid solution so that the ratio of phosphorus to fluorine in the final acid solution is at least 100:1, the temperature of the combustion gases being sufficient, at the pressure used, also to effect removal of substantially all of the free water in the acid solution with the fluorine values, effecting separation of the removed fluorine values and free water from the acid solution and, thereafter, cooling the resulting acid solution. In this manner, there is obtained an acidic phosphate solution having a greatly reduced fluorine content, which solution is suitable for preparing animal feed supplements and other uses, wherein the fluorine content of the final product obtained is important. The thus-produced defluorinated acidic phosphate solution may be cooled and recovered as a phosphate material having a high $P_2O_5$ concentration or, if desired, it may be diluted to obtain a defluorinated acidic phosphate solution having a lower $P_2O_5$ concentration.

More specifically, in the practice of the present invention an aqueous acidic phosphate solution containing fluorine impurities is treated in the manner set forth hereinabove. Typical acidic phosphate solutions to which the present process may be applied are solutions of phosphoric acid which have been prepared by the sulfuric acid process, i.e., the so-called wet process phosphoric acid. As is known to those in the art, wet process phosphoric acid is a crude, dilute phosphoric acid, normally corresponding to about 44 percent $H_3PO_4$. A typical wet process phosphoric acid is one containing about 32 percent $P_2O_5$, about 53 percent free water, about 11 percent combined water, with the remainder of the composition being made up of small amounts, generally within the range of about 0.1 percent to 2 percent of various other materials including $SiO_2$, $CaO$, $Fe_2O_3$, $Al_2O_3$ $Na_2O$, $K_2O$, $MgO$, $SO_3$, $CO_2$ and fluorine. While acidic phosphate solutions, other than wet process phosphoric acid may be treated by the process of the present invention, excellent results have been obtained when using this process with wet process phosphoric acid. Accordingly, primary reference hereinafter will be made to the treatment of wet process phosphoric acid. This is, however, not to be taken as a limitation of the present invention but merely as being exemplary thereof.

In purifying wet process phosphoric acid according to the present method, the wet process phosphoric acid treated may be in substantially the form in which it is obtained from the manufacturing process, i.e., having a $P_2O_5$ content of about 32 percent by weight. Generally, however, it has been found to be preferable that the wet process acid is further concentrated to a $P_2O_5$ content within the range of about 52 percent to 56 percent. In this manner, the free water present in the acid solution is reduced from about 53 percent to about 14–18 percent, thus greatly reducing the volume of acidic solution which must be handled. This concentrated wet process phosphoric acid is then formed into a film and the film is passed in countercurrent contact with hot combustion gases. These hot combustion gases are maintained in contact with the film of wet process phosphoric acid for a period of time which is sufficient to effect removal of substantially all of the free water in the wet process acid and also to reduce the fluorine content of the wet process acid to the point that the ratio of phosphorus to fluorine in the final acid solution is at least 100:1.

In order to effect this removal of fluorine and free water from the wet process phosphoric acid solution, it is important that the temperature of the combustion gas, at the pressure used, is sufficiently high and that a low weight ratio of acid solution to gas be maintained. Thus, it has been found that where weight ratios of the liquid phosphoric acid solution to be treated to the gaseous combustion treating gases is greater than about 2:1, the reduction of fluorine content of the acid solution to the desired degree is not always attained. Typically, the weight ratios are not in excess of about 2:1, with weight ratios not in excess of about 1:1 being preferred.

Normally, the contact of the film of wet process phosphoric acid and the hot combustion gases are carried out at substantially atmospheric pressure. If desired, however, either sub-atmospheric or super-atmospheric pressures may be used. Thus, although operation at atmospheric pressure is preferred, pressures within the range of about 700 millimeters to about 900 millimeters of mercury may be used.

With regard to the temperature of the wet process acid being treated and that of the combustion gas, substantially all of the heat needed to effect removal of substantially all of the free water from the acid and reduce the fluorine content of the acid may be provided by the combustion gases. Under such operating conditions, the wet process acid will be at ambient temperature and will, of course, vary over a wide range, for example from about 20 degrees centigrade to about 80 degrees centigrade, depending upon the time of the year, and the conditions under which the acid is stored. Generally, however, it has been found to be preferable that the wet process acid is heated prior to being brought into contact with the hot combustion gases. Not only does this make it possible to use lower combustion gas temperatures but, additionally, it reduces the contact time needed to defluorinate and remove substantially all of the free water from the wet process acid. While obviously, any heating of the acid which raises its temperature above ambient temperature is of value, in a typical operation, carried out at substantially atmospheric pressure, the acid is desirably heated to a temperature above about 100 degrees centigrade and is preferably heated to about 130 degrees centigrade to 140 degrees centigrade.

The temperature of the combustion gases with which the wet process acid is treated must, of course, be that which, in conjunction with the temperature of the wet process acid being treated, will effect the desired defluorination of the acid solution and the removal of substantially all of the free water therefrom. This will, of course, depend upon the temperature of the wet process acid being treated, the relative amounts of wet process acid and combustion gases, as well as the manner in which the countercurrent contact of the acid solution and gas is effected. Accordingly, it will be appreciated that the combustion gas temperature may vary over a wide range, e.g., from about 140 degrees centigrade up to 800 degrees centigrade, or higher, depending upon the materials of construction used. In a typical operation, wherein the wet process acid treated is at a temperature of about 130–140 degrees centigrade, using a weight ratio of liquid acid to combustion gas which is not in excess of about 2:1, combustion gas temperatures within the range of about 400 degrees centigrade to about 750 degrees centigrade are typical, with temperatures within the range of about 400 degrees centigrade to about 500 degrees centigrade being preferred. It is to be appreciated that in referring to the temperature of the wet process acid being treated and the temperature of the combustion gas which is used, the temperatures indicated are the temperatures of the acid solution and the combustion gas at the time of initial contact of the gas with the acid solution. Obviously, during the time of the countercurrent contact between the acid and the gas, the temperature of the acid solution will be raised while the gas temperature will be lowered. Thus, the temperature of the wet process acid which has been treated will be appreciably above about 140 degrees centigrade, e.g., 160 to 190 degrees centigrade, while the exit gas temperature will be considerably below the preferred 400 degrees centigrade to 500 degrees centigrade, e.g., 150 to 200 degrees centigrade.

In effecting the countercurrent contact between the wet process phosphoric acid being treated and the hot combustion treating gases, the acid solution is formed into a film, which film is continuously passed in countercurrent contact with the hot combustion gases. This film may be formed in various ways, such as by flowing the acid solution to be treated down the walls of a reactor, such as a tower, while passing the hot combustion gases upwardly through the tower, substantially countercurrent to the downward flow of the acid film. Other means of forming the film of the acid solution, so that it may be countercurrently contacted with the hot combustion gases, may also be used and are known to those of ordinary skill in the art. One technique which has been found to be particularly desirable in forming the wet process acid into a film, is to pass the acid solution downwardly through a packed column while passing the hot combustion gases upwardly through the column to effect the desired countercurrent contact of gas and liquid. In this manner, not only is the wet process acid solution formed into the desired film, but there is also insured an intimate contact between the acid film and the hot combustion gases so that the desired multiple, repeated stripping and absorption of the fluorine values is carried out and the acid defluorination and removal of free water is easily and quickly effected. For this reason, in the process of the present invention, it is preferred to pass the wet process phosphoric acid solution to be treated downwardly through a packed column in countercurrent contact with the hot combustion gases which pass upwardly through the column.

When operating in this preferred manner, various types and forms of packing materials may be used in the column. The only restriction on the packing materials used is that they can withstand the acidic conditions and high temperatures encountered in the column without detrimentally affecting the defluorination reaction or the purified acid product obtained. Also, the packing should be in a form which permits the flow of the acid solution downwardly through the column, and the combustion gases upwardly through the column, without too great a pressure drop. Exemplary of packing materials which may be used are those of carbon, beryl, and the like, in the form of rings, saddles, and the like. Excellent results have been obtained when using carbon rings, such as carbon Raschig rings, and for this reason hereinafter primary reference will be made to this type of packing material. This is not, however, to be taken as a limitation of the packing materials which may be used.

It is believed that the amount of packing materials, i.e., by the size of the column which is used, can readily be determined in each instance. The factors which may be taken into consideration in making this determination will, of course, be those which effect the contact time required between the acid solution and the gas in order to effect the desired defluorination and free water removal from the acid. These factors will include, the temperature of the acid solution to be treated and the temperature of the hot combustion gases, the amount of acid to be treated and the amount of hot combustion gases available for treating, the composition of the wet process phosphoric acid and the combustion gas mixture, as well as the type of packing material which is used. Those of ordinary skill in the art will be able, based on these considerations, to establish the size of the column which is needed.

As the wet process phosphoric acid passes through the packed column, in countercurrent contact with the hot combustion gases, it is dehydrated or concentrated, by the removal of the free water from the solution. Additionally, as has been indicated hereinabove, the acid solution is also heated. This hot, concentrated phosphoric acid solution, frequently having a $P_2O_5$ content of about 60 percent by weight, or higher, and having a greatly reduced fluorine content, may be recovered as such or preferably, it may be diluted, desirably at the time of the cooling operation, so that the acid product obtained is in a form which is more easily handled.

While recovery of the more concentrated acid product is possible, such a material becomes extremely viscous upon even slight cooling, due to its high $P_2O_5$ concentration. For this reason, where it is desired to have a more concentrated acid product, it has generally been found to be preferable if the cooling of the product is carried out after the material has been collected in containers suitable for storage or shipment.

Where it is desired to obtain a more dilute phosphoric acid product, the dilution and cooling of the material may be carried out substantially simultaneously. In a preferred method of effecting this dilution and cooling, the hot concentrated acid is admixed with water as it is passed through a packed bed or column similar to that through which it is passed for defluorination. A cooling gas, preferably air, is passed upwardly through the bed so as to effect a relatively rapid cooling of the dilute acid solution. In this manner, the diluted acid is formed into a film on the packing material in the bed or column and there is obtained a more rapid and intimate contact of the acid film with the cooling air, in much the same manner as the intimate contact between the initial wet process acid to be defluorinated and the hot combustion gases is achieved. In a typical operation, a concentrated, defluorinated acid containing better than 60 percent $U_2O_5$, at a temperature above about 170 degrees centigrade, is diluted to obtain a defluorinated commerical 80 percent $H_3PO_4$ (58 percent $P_2O_5$), at a temperature within the range of about 80 degrees centigrade to 100 degrees centigrade. The fluorine content of this acid is below about 0.2 percent and the acid is suitable for making animal feed supplements or other uses wherein a low fluorine content in the phosphoric acid is desirable.

With regard to the combustion gases which are used to effect the defluorination of the wet process phosphoric acid, these are combustion gases obtained by the burning of natural gas, oil, or the like. Typically, the combustion gas mixture will contain carbon dioxide, water vapor, nitrogen, oxygen, and the like, with the carbon dioxide forming a major portion of the components of the gas mixture. One convenient source of combustion gases for use in the process of the present invention are the so-called "flue gases" which are frequently available in industrial operations as by-products from the steam generation portion of the plant. Such gases, at a temperature of 700–800 degrees centigrade, may be brought into countercurrent contact with the film of wet process phosphoric acid which is to be defluorinated. Generally, however, it has been found that such high gas temperature is normally not required and that it may be desirable to effect cooling of these combustion gases, e.g., to a temperature within the range of 400 to 500 degrees centigrade, before the gases are passed in countercurrent contact with the wet process acid film. Although various means may be used to cool these gases, such as by passing them through a heat exchanger, this cooling is perhaps most easily accomplished by admixing cooling air with the combustion gases. Where the defluorinated, concentrated wet process acid is diluted and cooled by passing it in countercurrent contact with a stream of cooled air, this air is then desirably admixed with the hot combustion gas to effect the cooling thereof to the desired temperature range of 400 to 500 degrees centigrade, before it is brought into contact with the wet acid to be defluorinated.

In some instances, it has been found that the presence of sulfate ions ($SO_4^=$) in the wet process phosphoric acid which is to be defluorinated may aid and improve the fluorine reduction obtained by the operation of the present process. Accordingly, it may be desirable for the wet process acid to contain sulfate ions preferably in an amount in excess of the fluoride ions. It is to be appreciated, however, that excessive amounts of sulfate are not desirable in that some of this sulfate will be retained in the defluorinated phosphoric acid product and may thus be carried over into the ultimate product prepared from the defluorinated acid, such as the animal feed substances. For this reason, it is generally preferable that the amount of sulfate in the wet process phosphoric acid to be defluorinated is not greater than about 10 percent by weight of the acid.

Referring now to the drawing which is attached hereto and forms a part hereof, this is a schematic diagram of a preferred column for carrying out the defluorination process of the present invention. As shown in the drawing, this column is formed with three zones, a stripping zone, 1, a cooling zone, 3, and an intermediate zone, 5, betwen the stripping zone and the cooling zone. Both the stripping zone and the cooling zone are packed, preferably with carbon Raschig rings. The packed portions are indicated in the drawing by the large "X's". The wet process phosphoric acid, which has been previously concentrated to a $P_2O_5$ content of about 52–56 percent and which contains about 0.6–0.7 percent fluorine and about 3–5 percent $SO_4$, is heated to about 135–140 degrees centigrade. This hot acid solution is introduced into the top of the column, above the stripping zone, where it is formed into a firm on the packing of the column and flows downwardly through the stripping zone. A mixture of gas and air is introduced into a combustion zone, 7, where it is burned and the hot combustion gases are then introduced into the intermediate zone of the column between the cooling zone and the stripping zone. From the stripping zone, the wet process acid passes through the intermediate zone and as it enters the cooling zone it is admixed with water which is introduced just above the cooling zone. The diluted acid mixture passes through the cooling zone, forming a film on the packing of the zone and cooling air is introduced into the bottom of the column, below the cooling zone, where it passes upwardly through the cooling zone in countercurrent contact with the dilute acid mixture, into the intermediate zone. Within the intermediate zone, the cooling air is admixed with the hot combustion gases, effecting a partial cooling of the combustion gases, to within the desired temperature range, and the cooled combustion gas mixture passes upwardly through the stripping zone, in countercurrent contact with the wet process acid which is to be defluorinated. Within the stripping zone, the hot combustion gases effect removal of the fluorine values from the wet process phosphoric acid and also removal of substantially all of the free water from the acid. These gases, containing the free water and fluorine then pass upwardly through the stripping zone and out the top of the column from where they are ultimately discarded. The defluorinated wet process acid, which has been concentrated in the stripping zone, passes through the intermediate zone and is diluted with water and then passes through the cooling zone in countercurrent contact with the incoming cooling air. The thus-cooled and diluted acid is then recovered from the bottom of the column as the defluorinated phosphoric acid product, suitable for use in processing animal feed substances.

In order that those skilled in the art may better understand the present invention and the manner in which it may be practiced, the following specific examples are given. In these examples unless otherwise indicated, the temperatures are given in degrees centigrade and percents are by weight.

EXAMPLES 1 THROUGH 5

In these experiments, wet process phosphoric acid containing about 55 percent $P_2O_5$ and varying amounts of fluorine was passed through a column about 4 feet long and 2 inches inside diameter packed with ¼ inch carbon Raschig rings. A hot combustion gas, containing about 20 percent water vapor, was passed upwardly through the column in countercurrent contact with the wet process acid. The inlet and exit combustion gas temperatures were measured as well as the temperature of the defluorinated acid collected after passing through the column. The amounts of liquid acid and combustion gas passed through the column were also measured and the weight ratio of liquid to gas determined. In each instance, the fluorine content of the acid after passing through the column was determined. Using this procedure the following results were obtained:

introduced into the intermediate zone of the column, between the stripping zone and the cooling zone. In the intermediate zone, these combustion gases were admixed with cooling air, at a temperature of about 160 degrees centigrade, which cooling air had been introduced into the bottom of the column at the rate of about 2,000 standard cubic feet per minute and passed upwardly through the cooling zone into the intermediate zone. The resulting mixture of cooling air and combustion gases, at a temperature of about 455 degrees centigrade was passed upwardly through the stripping zone of the column, in substantially continuously countercurrent contact with the wet process phosphoric acid to be defluorinated. At the top of the column, the gas mixture, containing removed fluorine values and free water from the phosphoric acid, at a temperature of about 170 degrees centigrade, was removed and passed to the waste disposal treatment. From the bottom of the stripping zone of the column a concentrated, defluorinated wet process phosphoric acid, having a $P_2O_5$ content of about 63 percent and at a temperature of about 177 degrees centigrade was passed through the intermediate zone to the cooling zone where it was admixed with water, introduced at the rate of about 0.57 ton per hour. The resulting dilute acid mixture was passed through the cooling zone, in countercurrent contact with the cooling air which was passed upwardly through the cooling zone. From the bottom of the column there was recovered a defluorinated phosphoric acid product at the rate of about 7.04 tons per hour, which product contains 58 percent $P_2O_5$ (about 80 percent $H_3PO_4$), about 0.15 percent fluorine and which was at a temperature of about 91 degrees centigrade.

It is to be noted that the process as carried out according to the predescribed manner does not include the addition of extraneous steam. This is another advantage of this invention since lower costs for the purification of acidic phosphate solutions are thereby obtained.

While there have been described various embodiments of the invention, the compositions and methods described are not intended to be understood as limiting the scope of the invention, as it is realized that changes therewithin are possible and it is further intended that each element recited in any of the following claims is to be understood as referring to all equivalent elements for accomplishing substantially the same results in substantially the same or equivalent manner, it being intended to cover the invention broadly in whatever form its principles may be utilized.

| Example | Percent Fluorine In Feed Acid | Amount of Acid In Pounds/Hour Per Square Foot of Packing | Amount of Combustion Gas In Pounds/Hour Per Square Foot of Packing | Ratio Acid to Gas | Inlet Gas Temperature In Degrees Centigrade | Exit Gas Temperature In Degrees Centigrade | Exit Acid Temperature In Degrees Centigrade | Percent Fluorine In Stripped Acid |
|---|---|---|---|---|---|---|---|---|
| 1 | 0.72 | 1,040 | 176 | 5.9 | 494 | 125 | 151 | 0.60 |
| 2 | 0.72 | 455 | 176 | 2.6 | 320 | 144 | 166 | 0.47 |
| 3 | 0.34 | 483 | 257 | 1.9 | 300 | 139 | 166 | 0.18 |
| 4 | 0.34 | 176 | 257 | 0.69 | 198 | 143 | 158 | 0.14 |
| 5 | 0.46 | 134 | 257 | 0.52 | 204 | 169 | 168 | 0.14 |

EXAMPLE 6

In an actual production run, using apparatus similar to that shown in the drawing, wet process phosphoric acid was treated by passing it through a three zone column, both the stripping zone and the cooling zone being about 15 feet in length, and about 5 feet in diameter, and containing 2 inch carbon Raschig rings as packing. Wet process phosphoric acid having a $P_2O_5$ content of about 54 percent and containing 0.6 percent fluorine and about 5.0 percent $SO_4$ was heated to a temperature of about 138 degrees centigrade and was introduced into the top of the stripping zone at a rate of about 7.64 tons per hour. Natural gas, at the rate of 3,900 cubic feet per hour and air at the rate of 2,450 standard cubic feet per minute were burned and the resulting combustion gases at a temperature of about 705 degrees centigrade were

What is claimed is:

1. A process for purifying an aqueous acidic phosphate solution containing fluorine values as impurities which comprises forming the aqueous acidic phosphate solution to be purified into a film, continuously passing said film in countercurrent contact with hot combustion gases, maintaining the hot combustion gases in contact with the acid phosphate solution in a weight ratio of acid solution to combustion gas of from 0.5:1 to about 2:1, while effecting multiple, repeated strippings and absorptions of the fluorine values in the acid solution, for a period of time sufficient to reduce the fluorine content of the acid solution so that the ratio of phosphorus to fluorine in the final acid solution is at least 100:1, the temperature of the combustion gases, being sufficient, at the pressure used, also to effect removal of substantially all of the free water in the acid solution with the fluorine values and effecting separation of the removed fluorine values and free water from the acid phosphate solution, then passing the acid phosphate solution into a cooling zone, and recovering therefrom an acidic phosphate solution of reduced fluorine content.

2. The process as claimed in claim 1 wherein the defluorinated wet process phosphoric acid product is diluted with water prior to cooling.

3. The method as claimed in claim 2 wherein the temperature of the wet process phosphoric acid to be treated is above about 100 degrees centigrade and the temperature of the combustion gases with which the acid is contacted is within the range of about 350 degrees centigrade to about 800 degrees centigrade.

4. A process for purifying an aqeous acidic phosphate solution containing fluorine values as an impurity which comprises introducing the aqueous acidic phosphate solution to be purified into a stripping zone, forming the acidic solution into a film within the stripping zone, passing the thus-formed film through the stripping zone, continuously passing hot combustion gases into the stripping zone in a direction substantially countercurrent to the flow of the acid solution film through the stripping zone in a weight ratio of acid solution to combustion gas of from 0.5:1 to about 2:1, so as to effect a substantially countercurrent contact between the hot combustion gases and the acidic solution film, maintaining the combustion gases in contact with the film of acid solution, while effecting multiple, repeated strippings and absorptions of the fluorine values in the acid solution for a period of time sufficient to reduce the fluorine content of the acid solution so that the ratio of phosphorus to fluorine in the final acid solution is at least 100:1, the temperature of the combustion gases being between about 350 and 800 degrees centigrade, at substantially atmospheries pressure, also to effect removal of substantially all of the free water in the acid solution with the fluorine values, separating the removed fluorine values and free water from the film of acid solution, removing the acid solution from the stripping zone as an acidic phosphate solution having a reduced fluorine content and an increased $P_2O_5$ content, passing the thus-obtained acidic phosphate solution through an intermediate zone into a cooling zone, adding water to the acidic phosphate solution as it is introduced into the cooling zone so as to effect a dilution thereof, forming the thus-diluted acidic phosphate solution into a film within the cooling zone, passing the thus-formed film through the cooling zone, introducing cooling air into the cooling zone, passing said cooling air in substantially countercurrent contact with the acid solution film in the cooling zone, and recovering from the cooling zone an aqueous acidic phosphate solution having a reduced fluorine content.

5. The method as claimed in claim 4 wherein the hot combustion gases are initially introduced into the intermediate zone between the cooling zone and the stripping zone, wherein they are admixed with the cooling air which has been passed through the cooling zone.

6. The method as claimed in claim 5 wherein the aqueous acidic phosphate solution to be treated is a wet process phosphoric acid.

7. The method as claimed in claim 6 wherein the wet process phosphoric acid solution initially has a $P_2O_5$ content within the range of about 52 to 56 percent, the dehydrated phosphoric acid solution obtained from the stripping zone has a $P_2O_5$ content within the range of about 60 to 65 percent and the final phosphoric acid solution product obtained from the cooling zone has a $P_2O_5$ content within the range of about 55 to 60 percent.

8. The method as claimed in claim 7 wherein the initial wet process phosphoric acid solution to be treated is heated to a temperature within the range of about 100 degrees centigrade up to the boiling point of the solution before it is introduced into the stripping zone, the concentrated phosphoric acid solution obtained from the stripping zone is at a temperature within the range of about 160 to 180 degrees centigrade and the final phosphoric acid solution product obtained from the cooling zone is at a temperature within the range of about 80 to 100 degrees centigrade.

9. The method as claimed in claim 8 wherein the hot combustion gases introduced into the intermediate zone are at a temperature within the range of about 700 to 800 degrees centigrade and the combustion gas mixture brought into countercurrent contact with the acid solution film in the stripping zone is initially at a temperature within the range of about 400 to 500 degrees centigrade.

10. The process as claimed in claim 9 wherein the multiple, repeated strippings and absorptions of the fluorine values in the acid solution are effected by contacting the acid solution with the hot cobustion gas in a packed column.

References Cited

UNITED STATES PATENTS

| | | | |
|---|---|---|---|
| 1,833,717 | 11/1931 | Laird | 203—49 |
| 2,611,681 | 9/1952 | Bellinger | 159—49 X |
| 2,962,357 | 11/1960 | Williams et al. | 23—165 |
| 2,977,196 | 3/1961 | Fleming | 23—165 |
| 2,995,436 | 8/1961 | Hollingsworth et al. | 23—259 X |
| 3,104,946 | 9/1963 | Veal | 23—159 X |
| 3,276,510 | 10/1966 | Austin et al. | 23—165 X |
| 2,732,192 | 1/1956 | Johnson et al. | 62—121 X |

FOREIGN PATENTS

| | | |
|---|---|---|
| 864,886 | 4/1961 | Great Britain. |
| 911,040 | 11/1962 | Great Britain. |

NORMAN YUDKOFF, *Primary Examiner.*

F. E. DRUMMOND, *Assistant Examiner.*